United States Patent
Wozniak et al.

(10) Patent No.: US 10,701,557 B2
(45) Date of Patent: Jun. 30, 2020

(54) AUTHENTICATION METHOD FOR CONNECTING A COMPANION DEVICE WHEN SAME IS DISCONNECTED FROM A SUBSCRIBER DEVICE

(71) Applicant: IDEMIA FRANCE, Colombes (FR)

(72) Inventors: Tomasz Wozniak, Colombes (FR); Guillaume Larignon, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 114 days.

(21) Appl. No.: 15/738,447

(22) PCT Filed: Jun. 28, 2016

(86) PCT No.: PCT/FR2016/051597
§ 371 (c)(1),
(2) Date: Dec. 20, 2017

(87) PCT Pub. No.: WO2017/001763
PCT Pub. Date: Jan. 5, 2017

(65) Prior Publication Data
US 2018/0184293 A1    Jun. 28, 2018

(30) Foreign Application Priority Data

Jun. 29, 2015 (FR) ..................... 15 01360

(51) Int. Cl.
*H04W 12/06* (2009.01)
*H04L 9/32* (2006.01)
(Continued)

(52) U.S. Cl.
CPC ........... *H04W 12/06* (2013.01); *H04L 9/3271* (2013.01); *H04W 4/80* (2018.02); *H04L 2209/80* (2013.01); *H04W 12/00403* (2019.01)

(58) Field of Classification Search
CPC . H04W 12/06; H04W 4/80; H04W 12/00403; H04L 9/3271; H04L 2209/80
See application file for complete search history.

(56) References Cited

U.S. PATENT DOCUMENTS 8,706,100 B1 *  4/2014  Booth ............... H04M 3/42272
                                                455/409
8,806,590 B2 *  8/2014  Salada ................ G06Q 10/107
                                                726/6

(Continued)

FOREIGN PATENT DOCUMENTS

EP    1487228 A2    12/2004
EP    2658297 A1    10/2013
WO    2011/084117 A1    7/2011

OTHER PUBLICATIONS

International Search Report dated Oct. 19, 2016, International Application No. PCT/FR2016/051597, pp. 1-7.
(Continued)

*Primary Examiner* — Christopher A Revak
(74) *Attorney, Agent, or Firm* — MH2 Technology Law Group, LLP

(57) ABSTRACT

Authentication device and method for a system that includes a subscriber device and a companion device. The authentication method includes the subscriber device delivering to the companion device a temporary profile and an authentication response signed by the subscriber device for sending to a server, installing the temporary profile to configure a second wireless communication interface of the companion device, and requesting a second authentication from the server via the second interface by using the delivered authentication response so as to authorize the second interface when the companion device and the subscriber device are not in communication with each other via the first communication interface. The device and method may be (Continued)

used by systems that include a subscriber device (e.g., a mobile telephone) and a companion device, e.g. a connected watch or object.

11 Claims, 2 Drawing Sheets

(51) Int. Cl.
    *H04W 4/80*     (2018.01)
    *H04W 12/00*     (2009.01)

(56) References Cited

U.S. PATENT DOCUMENTS

| | | | |
|---|---|---|---|
| 8,898,743 B1 | 11/2014 | Kowalik et al. | |
| 9,351,193 B2* | 5/2016 | Raleigh | H04L 69/14 |
| 9,398,452 B1* | 7/2016 | Upp | H04W 12/04 |
| 9,807,661 B1* | 10/2017 | Manepalli | H04W 36/245 |
| 9,986,421 B2* | 5/2018 | Li | H04W 12/04 |
| 10,143,271 B2* | 12/2018 | Zhang | A44C 5/04 |
| 2005/0122941 A1* | 6/2005 | Wu | H04W 12/0602 |
| | | | 370/338 |
| 2013/0262629 A1 | 10/2013 | Zawacki et al. | |
| 2014/0171027 A1* | 6/2014 | Arkko | H04L 63/0853 |
| | | | 455/411 |

OTHER PUBLICATIONS

3GPP, "3rd Generation Partnership Project; Technical Specification Group Services and System Aspects; 3GPP System Architecture Evolution (SAE); Security aspects of non-3GPP accesses; (Release 8)", vol. 33.402, No. v8.2.1, Dec. 1, 2008, pp. 1-41.

* cited by examiner

AUTHENTICATION METHOD FOR CONNECTING A COMPANION DEVICE WHEN SAME IS DISCONNECTED FROM A SUBSCRIBER DEVICE

CROSS-REFERENCE TO RELATED APPLICATIONS

This application is a U.S. National Stage application of International Application No. PCT/FR2016/051597 filed 28 Jun. 2016, which claims priority to French Application No. 1501360 filed 29 Jun. 2015, the entire disclosures of which are hereby incorporated by reference in their entireties.

The field of the invention relates to a method of authenticating a companion device with an authentication server of a mobile telephone operator, the companion device being connectable to a communication service of the operator via a subscriber device.

The mobile telephone market is seeing the appearance of wearable accessory devices, also referred to as "companion" devices, that connect to a communication service of a mobile telephone operator via the mobile telephone while the telephone is authenticated with the network by means of its telephone subscription. For example, connected watches or "smartwatches" enable a user to receive email notifications, weather forecasts, or telephone calls when the watch is connected to the mobile telephone via short range communication, generally communication using the Bluetooth standard. For this to operate, the watch needs to be in the proximity of the mobile telephone.

However, it often happens that a user forgets his/her mobile telephone somewhere. Usually, for reasons of integration and cost reduction, the watch does not have its own telephone network subscription card (i.e. a subscriber identity module (SIM)). It is then not provided with the communication that would enable it to receive the desired content because it is too far away from the mobile telephone.

There exists a software environment for a watch that makes provision, when the user moves away from the mobile telephone, for a connection to be initiated by means of a WiFi interface instead of the Bluetooth interface. This reconfiguration of communication enables connectivity of the watch to be maintained up to a range of several tens of meters.

Nevertheless, that solution cannot be envisaged when the user moves several kilometers away, e.g. on going away from home.

Known patent document US2013/0262629A1 describes a system comprising a base device and a satellite device, the satellite device operating via the base device in an attached mode, via a wired connection. The system makes provision for setting up a tunnel connection between the base and the satellite by means of a prior exchange of tunnel key pairs while they are connected together so as to enable mutual authentication.

U.S. Pat. No. 8,898,743 B1 is also known, which describes a method of content control for a multimedia device via a plurality of communication interfaces.

Those documents describe methods of access to content services, but they do not propose solutions for individual authentication with a communication network when a companion device is far away from the subscriber device.

More precisely, the invention provides a method of authenticating a companion device with an authentication server of a mobile telephone operator, the companion device being connectable to a communication service of the operator via a subscriber device that has performed a first authentication with the server, the companion device being in communication with the subscriber device via a first wireless communication interface of short range. According to the invention, the method comprises the following steps:
the subscriber device delivering to the companion device a temporary profile and an authentication response signed by the subscriber device for sending to the server;
installing the temporary profile to configure a second wireless communication interface of the companion device; and
requesting a second authentication from the server via the second interface by using the delivered authentication response so as to authorize the second interface when the companion device and subscriber device are not in communication with each other via the first communication interface.

In a variant, the authentication response was signed by the subscriber device in order to perform the first authentication.

In a variant, the method also comprises a step of the subscriber device notifying the authentication server in order to allow the authentication response to be used during the second authentication.

In a variant, the notification comprises the authentication response.

In a variant, the authentication response is encrypted by the subscriber device prior to delivery, e.g. by means of a public key of the companion device, or indeed by means of secret data known to the subscriber device and to the companion device. The secret data may be of the symmetrical type or of the asymmetrical type.

In a variant, the authentication response is delivered via the first interface or via a secure third interface of short range, e.g. in compliance with the ISO/IEC 14443 standard.

In a variant, the method includes a step of notifying presence information to the authentication server and/or to a services server concerning the presence of the user and coming from the companion device so as to trigger forwarding of services coming from of the services server directly to the companion device via the second interface.

In a variant, the second interface is a mobile telephone communication module and the authentication response includes at least a response cryptogram that was generated from a random number transmitted by the authentication server and encrypted using a private key hosted by the subscriber device.

In a variant, the second interface complies with the IEEE802.11 standard, and the authentication response enables the companion device to perform authentication of the EAP type.

The invention also provides a system comprising a companion device and a subscriber device for authenticating the companion device with an authentication server of a mobile telephone operator, the companion device being connectable to a communication service of the operator via a subscriber device that has performed a first authentication with the server, the companion device being in communication with the subscriber device via a first wireless communication interface of short range.

According to the invention, the subscriber device includes means for delivering to the companion device a temporary profile and an authentication response signed by the subscriber device for sending to the server, the companion device includes means for installing the temporary profile in order to configure a second wireless communications interface of the companion device, and the companion device includes means for executing a second authentication with the server via the second interface by using the delivered authentication response so as to authorize the second interface when the companion device and subscriber device are not in communication with each other via the first communication interface.

By means of the invention, the companion device remains connected when the subscriber device is far away. The invention makes it possible to avoid the cost of an additional secure integrated circuit for hosting identifiers and cryptographic means in permanent manner.

Other characteristics and advantages of the present invention appear more clearly on reading the following detailed description of embodiments of the invention given as non-limiting examples and illustrated in the accompanying drawings, in which.

Figure 1:
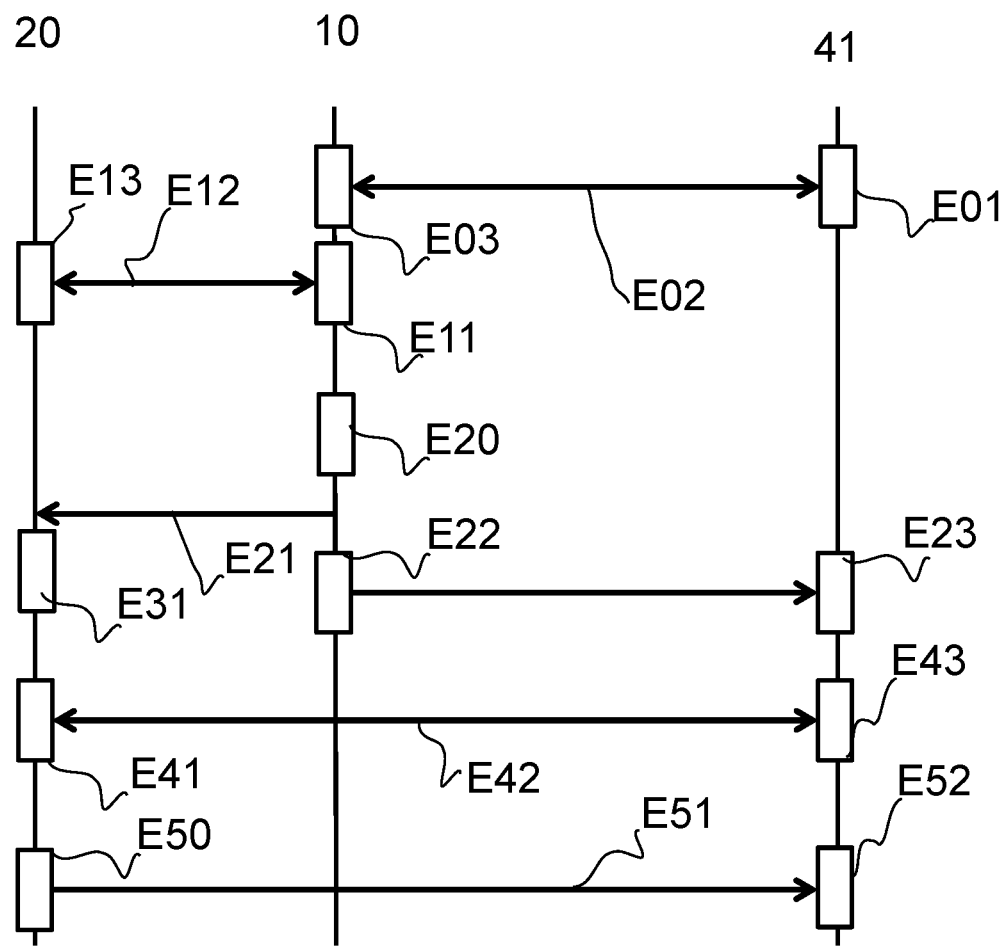
FIG. 1 shows the method of authenticating a companion device and a subscriber device in accordance with the invention.

The method in accordance with the invention applies to a system comprising a companion device and a subscriber device having a communications subscription with a service of a mobile telephone operator. FIG. 1 shows the authentication method for a subscriber device 10 and a companion device 20 on a cell phone network to which access is controlled by an authentication server 41. The cell phone network carries exchanges of voice data and of Internet protocol (IP) network data, e.g. it is a network of the second, third, or fourth generation (2G, 3G, or 4G). It is possible that the telephone operator also has an alternative communications network via medium-range wireless access points of the WiFi type. The access points are connected to a wired data network, e.g. of the asymmetric digital subscriber line (ADSL) type or of the optical fiber type. The authentication server 41 also controls access to this network. The authentication server 41 is a functional entity distributed over one or more physical entities that collaborate together.

The term "companion device" 20 is used to mean an electronic device that does not benefit from its own independent authentication module for identifying itself with the server 41. The companion device is associated with a subscriber device 10 that contains all of the identification means needed to obtain authentication with the server 41 in independent manner. It can be understood that the companion device is not designed to operate on its own in order to benefit from the services of the mobile telephone operator.

The identification means C1 of the subscriber device 10 comprise a subscriber profile, private encryption keys, encryption algorithms, and any identification parameters. In response to an identification request from the server 41, the subscription profile generates an authentication response, e.g. a signed cryptogram that has been generated by encrypting a challenge supplied by the server using a private key and an encryption algorithm.

In the context of authentication with a telephone network, this is a subscriber profile with the telephone operator for connecting to the mobile network, in particular the identifier of the subscriber, referred to as the "international mobile subscriber identity" (IMSI), private operator keys, a master key or a derived key used for encrypting a random number from the server or for encrypting communication data, together with files and parameters for connection with the server 41.

In a variant, the method also makes it possible to use an extensible authentication protocol (EAP) with an access point to a medium-range wireless network of the WiFi type. The identification means C1 are the subscriber profile, the encryption keys, and the encryption algorithms for obtaining authentication via the WiFi access point.

It is possible to envisage that the identification means C1 serve to obtain authentication both with a mobile telephone network and also with an access point.

The subscriber device 10 includes a secure integrated circuit 13 or a trusted software environment complying with security constraints and standards. The integrated circuit or trusted environment (TE) are said to be "secure" since access to the memory of the integrated circuit is protected by a password or a secret phrase. It is thus not possible to read the data fraudulently. The integrated circuit is a SIM card, an embedded secure element (eSE). Preferably, the identification means C1 of the subscriber device 10 are hosted in the secure integrated circuit 13 or in the trusted software environment.

The companion device 20 does not have its own secure integrated circuit specifically for the purpose of authenticating itself with the server 41. The companion device does not store identification means permanently, and thus avoids expensive certification of an integrated circuit and its supply chain. The companion device may be a wearable accessory, e.g. a watch, or more generally any object which is connected to a communication service via a subscriber device, e.g. a TV, a tablet, or multimedia equipment in a vehicle connected via Bluetooth or WiFi.

As shown in FIG. 1, the authentication method comprises a first stage of authenticating the subscriber device 10 with the authentication server 41 of the mobile telephone operator. The subscriber device 10 is in communication with the companion device 20 via a first wireless communication interface of short range (Bluetooth, WiFi). So long as the subscriber device is not authenticated with the server 41, neither the subscriber device 10, nor the companion device 20 can transmit and receive calls and data, e.g. data coming from the mobile telephone network. They can only exchange information locally, i.e. information contained in one or the other of the devices via the first communication interface.

During a step E01, after receiving an identifier (IMSI) of the subscriber device 10, the server 41 identifies the private key(s) hosted in the subscriber module hosted either in the secure integrated circuit 13 or in a secure environment. During this step E01, the server 41 generates a random number, also referred to as a challenge, that is transmitted to the subscriber device 10 in order to authenticate its authentication response. In accordance with the conventional authentication process, the server 41 also decrypts the random number with the private key of the subscriber device, which key is known from its databases on the basis of the identifier IMSI. The server 41 generates a verification cryptogram that subsequently serves to authenticate the authentication response of the subscriber device 10 by comparing the signed authentication response with the verification cryptogram.

In a step E03, the subscriber device 10 performs the authentication operation, and during this step it generates in particular the authentication response on the basis of its private key and the random number from the server 41. The authentication response is a signature cryptogram obtained by executing an encryption algorithm, e.g. MILENAGE, COMP128, A3, A8, in compliance with the standard of the global system for mobile communication (GSM). The authentication response is known as a signed response (SRES).

During the step E02, the exchanges between the subscriber device 10 and the server 41 take place via the mobile telephone network in order to perform the first authentication.

If the subscriber device is authenticated successfully with the server 41, it becomes authorized to receive and send calls and data over the mobile telephone network. The steps E01, E02, and E03 are conventional steps for a stage of authentication with a mobile telephone network.

In a variant, the steps E01, E02, and E03 are EAP type steps of the authenticating subscriber device with an access point complying with the IEEE802.11 standard.

Thereafter, when the companion and subscriber devices are in communication via the short-range wireless interface (Bluetooth, WiFi), they can exchange data. The data is received by the subscriber device 10 and comes from the mobile telephone network via the GSM interface of the device, as managed by the mobile telephone operator administrating the authentication server 41.

During a step E11, the subscriber device receives data from the mobile telephone network via its GSM interface. In a step E12, data exchanges take place between the subscriber device 10 and the companion device 20 via the short-range wireless communication interface and in step E13, the companion device 20 receives and processes the data, displays notifications, emails, etc . . . . The companion device 20 is thus operational to operate normally via the subscriber device 10.

Figure 2A:
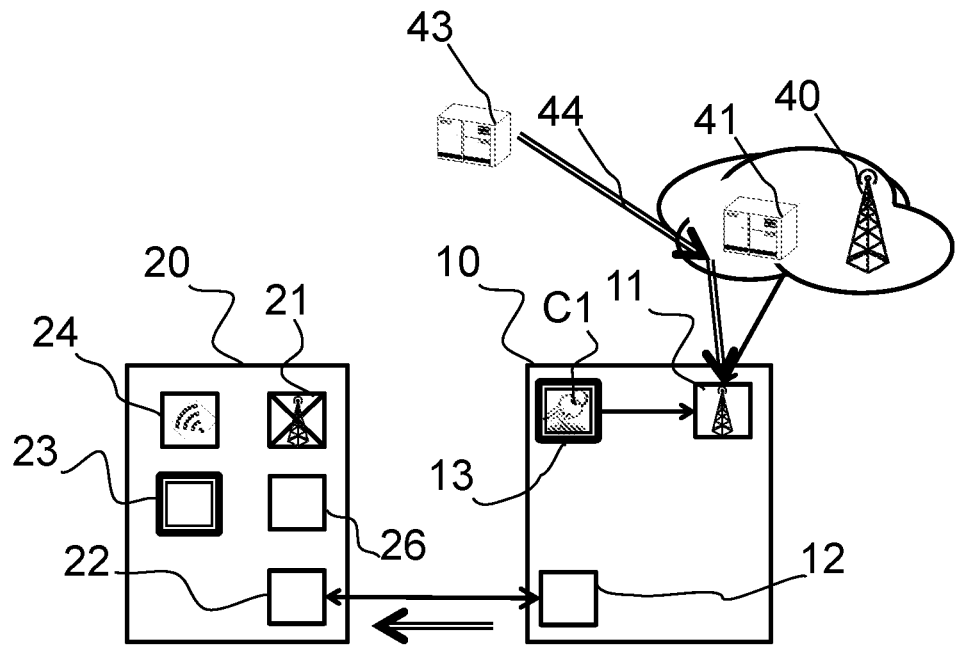
FIG. 2A shows the system formed by the companion device and the subscriber device when they are in communication with each other.

FIG. 2A shows the companion and subscriber devices when they are in communication with each other via their respective short-range wireless communication interfaces 12 and 22.

The subscriber device 10 includes the secure integrated circuit 13 containing the authentication package C1 capable of preparing an authentication response generated during authentication with the server 41. It has the interface 11 for communicating with the mobile telephone network 40.

The companion device 20 has the interface 22 for communicating with the subscriber device 10 and an interface 21 for communicating with a mobile telephone network. At this stage of the method, the interface 21 is not entitled to authenticate itself with a mobile telephone network since it does not have means for identification and authentication with the network of the operator.

It also has other communication interfaces 24 and 26 for communicating in compliance with a WiFi protocol, or a near-field ISO/IEC 14443 protocol, respectively.

The companion device 20 includes a secure integrated circuit 23 containing secure applications or data for operating with the near-field communication interface 26. The applications may be payment or transport applications, for example. The applications hosted in the secure integrated circuit 23 can use the ISO/IEC 14443 protocol to exchange data with the interface 26.

It should be observed that a server 43 for managing multimedia services or for exchanging content (calls, data, information notifications, short message service (SMS)) controls the sending of data to applications hosted in the subscriber device 10. The companion device 20 then receives the data from the server 43 via the subscriber device 10. Arrows 44 represent the data streams issued by the services server 43.

Furthermore, the authentication method includes a step E20 of preparing an authentication package C2 for transmitting to the companion device 20 via the short-range interface 22. The authentication package comprises at least a temporary profile and an authentication response signed by the subscriber device 10, preferably during the first authentication E03. The authentication package preferably also includes parameters for connection to the server 41. By way of example, the temporary subscriber profile comprises a temporary IMSI number associated with the profile of the subscriber of the subscriber device 10. Other authentication responses can be included depending on the first authentication to be performed.

The authentication package C2 is a software package comprising files, scripts, and parameters necessary for installing software in the companion device 20 in order to execute authentication functions with a communication interface. For example, the software package may comprise a suite of application protocol data unit (APDU) command instructions for installing the authentication package in the secure element 23.

It should be observed that the temporary profile can be recognized by the server 41 since it is associated with the profile of the subscriber present in the subscriber device 10. The temporary profile may be a clone of the subscriber profile or it may be an identifier that is derived from the identifier of the subscriber. The profile is temporary, since it is valid for a limited duration, e.g. a duration predefined by the server 41.

In a step E21, the method comprises the subscriber device delivering the temporary profile and the authentication response to the companion device 20 via the short-range wireless communication interface. The steps E20 and E21 may be executed on the initiative of the user, automatically with a refreshment plan, or following an event of the subscriber device 10 being authenticated with the authentication server 41.

In a variant, the temporary profile and the authentication response are delivered via another secure short-range wireless interface 26, e.g. via an interface in compliance with the ISO/IEC 14443 standard. This interface has a range of a few centimeters. The authentication package is prepared and exchanged at the initiative of the user or on request of the subscriber device or of the companion device via respective applications and screens of the devices. It should be observed that the subscriber device 10 is then also provided with a short-range wireless communication interface in compliance with the ISO/IEC 14443 standard.

In step E31, the method comprises installing E31 the temporary profile of the subscriber belonging to the authentication package C2 in order to configure a second wireless communication interface 21, 24 of the companion device 20. Installation is the stage of writing the temporary profile in the secure element 23. By way of example, it consists in setting the parameters of the connection (access address of the server), and selecting the authentication protocol. The signed authentication response transmitted during delivery E21 is stored in the secure element 23.

Furthermore, in the context of the invention, provision is made for the authentication package C2 installed in the integrated circuit 23 to be capable of exchanging data with the communication interfaces 21 and 24. In particular, the authentication package C2 makes it possible to carry out an authentication protocol in compliance with a protocol for authentication with a mobile telephone network via the interface 21 and/or for authentication with a network in compliance with the IEEE802.11 standard via the interface 24.

Figure 2B:
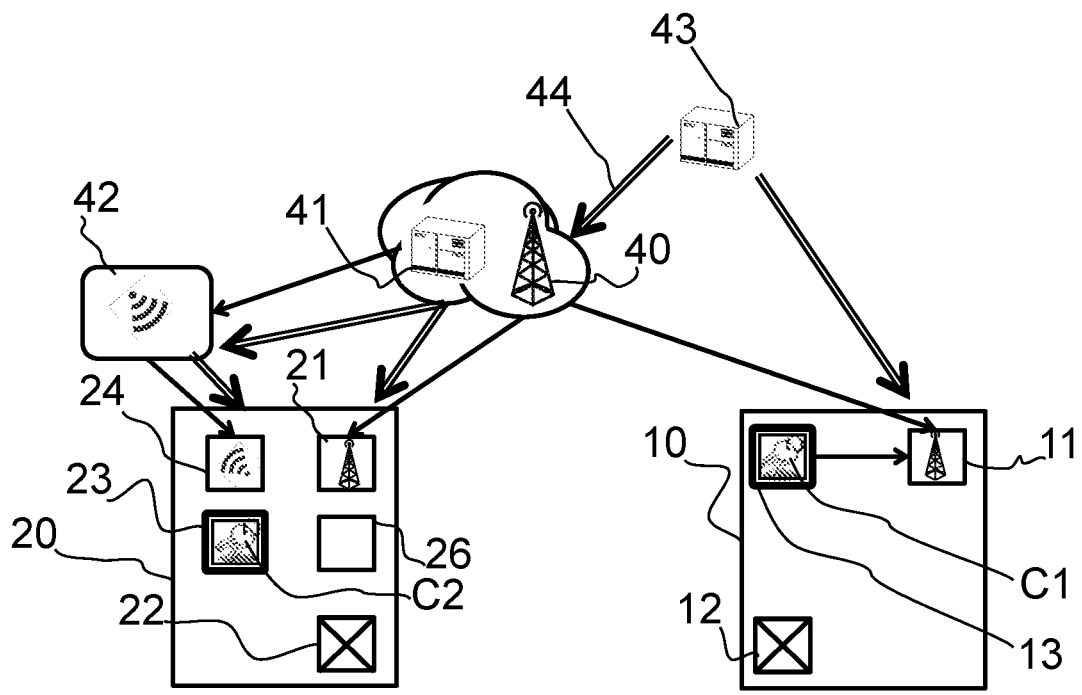
FIG. 2B shows the system formed by the companion device and the subscriber device when they are no longer in communication with each other.

FIG. 2B shows the situation when the subscriber device 10 has moved away from the companion device 20 such that the interface 22 is no longer in communication with the interface 12, e.g. when the user leaves home, forgetting the telephone. The interface 22 is no longer synchronized with the interface 12 and is no longer entitled to receive data. The end of communication is detected by a detection event of the companion device 20, and also by the subscriber device 10. The detection event may be a status of the communication indicating the presence of a communication or the loss of a communication.

In a variant, the method also has a notification step E22 of the subscriber device 10 notifying the authentication server 41 in order to authorize the use of the authentication response during a second authentication E41. This notification is triggered as a function of the status of the communication. When the subscriber device 10 detects the end-of-communication event with the companion device 20 via the interfaces 12 and 21, it transmits the notification E22.

The notification E22 may comprise an identifier of the authentication response that is to be authorized, the data necessary for generating the authentication response, the authentication response or a response derived from the authentication response to enable the server 41 to proceed with verifying E43 the second authentication.

In step E23, the server 41 authorizes a second authentication using the authentication response signed by the subscriber device 10 and by a temporary subscriber profile.

The steps E22, E23 enable the server 41 to secure the use by a companion device of the authentication response signed by the subscriber device. If the notification is not received, the server refuses a second authentication with the authentication response.

In a step E41, the method includes a second authentication of the companion device 20 with the server 41 using the authentication response signed by the subscriber device, with this taking place via the second interface 21. The second authentication enables the second interface to be authorized when the companion device 20 and the subscriber device 10 are not in communication with each other via the first communication interface 22. An authentication protocol application controls the exchanges E42 with the server 41.

It should be observed that the second authentication is performed when the end-of-communication status between the subscriber device and the companion device is detected.

A step E43 of the method comprises the steps of verifying the authentication response coming from the companion device. The authentication is accepted if the signature of the authentication response complies with the identity of the subscriber and if the server 41 has previously been notified of the use of the authentication response, where applicable.

If the authentication response does not comply with the temporary identity of the subscriber 10, then the server refuses authentication in step E43.

It should be observed that the authentication responses was signed by the subscriber device 10 and transmitted to the server 41 during the first authentication E03. The authentication response was signed by the subscriber device in order to perform the first authentication E03.

In a variant, the server 41 transmits a challenge from which the subscriber device derives a derived challenge and the server 41 also derived a derived challenge in parallel using rules known to both entities. A derived challenge can be signed and transmitted to the companion device 20 in order to undertake the second authentication.

It is also possible to envisage that, during a first authentication, the server transmits a plurality of challenges in order to generate a plurality of authentication responses that are subsequently signed by the subscriber device.

In a variant, the authentication request E41 complies with the EAP protocol and is used to entitle the interface E24 of the companion device 20 to communicate with an access point 42 in compliance with the IEEE802.11 standard. This variant is performed when the first authentication E03 with the server 41 complies with the EAP protocol for a WiFi interface of the subscriber device 10.

It is possible to envisage that the server 41 delegates the authentication steps to a trusted authentifier of the operator's network 42, e.g. to a WiFi access point.

Furthermore, in a variant, the notification E22 also triggers forwarding of the services from the management server 43 (i.e. of the data stream 44) so that it goes directly to the companion device 20 at the same time as it goes to the subscriber device 10, or in another embodiment, so that it goes solely to the companion device 20. For this purpose, it is possible to envisage that the authentication server 41 sends a forwarding order to the server 43.

In a variant, the notification E22 is also transmitted to the server 43 for managing multimedia services or for exchanging content with a services application of the companion device 20 and of the subscriber device 10, the notification being sent directly to the services management server 43.

In a variant, the forwarding order is also a function of detecting successful authentication E43 of the companion device 20 by the server 41.

In a variant, the method includes a second notification E51 of the companion device 20 sent to the server 41 and/or to the service server 43 conveying information concerning the presence of the user in association with the companion device 20. The presence information results from a successful action E50 on a user interface of the companion device (screen input, button press, voice capture or audio message, reading a fingerprint, reading a pulse, reading a heart rate, or a capture by a camera) or of a successful request E50 to input a secret key, reading a fingerprint, or detecting the user's voice on the companion device 20.

The server 41 generates a forwarding order E52 for forwarding the services stream 44, which order is sent to the services server 43 in compliance with the presence information. If the presence information indicates that the user is present, the services stream 44 is sent directly to the companion device 20, exclusively or otherwise.

The second notification E51 is sent by the device 20 when the second authentication is successful and the communication interface 21 (or 24) is authorized by the server 41.

In this situation, the server 41 (and in parallel the multimedia services or content exchange server 43) is informed that the subscriber device 10 is temporarily far away from the user as a result of detecting the break in the connection between the companion device and the subscriber device (via the notification E22) and detecting the presence of the user with the companion device 20 (via the second notification E51).

It should also be observed that, in a variant, the method includes a step (not shown in the figure) of authenticating the user by inputting a secret code, reading a fingerprint, or detecting voice on the companion device in order to authorize the second authentication request E41. Thus, use of the signed authentication response is made secure against being used by an unrecognized third party.

The authentication method avoids having recourse to a SIM type secure integrated circuit of a telephony operator that needs to be certified by official organizations in order to host an authentication package on a permanent basis, in particular with the private cryptographic keys, for authentication with the authentication server 41. By way of example, it is possible to envisage using the integrated circuit 23 that is for hosting near-field contact (NFC) payment applications. The method benefits from the security of the integrated circuit 23 used by other secure applications while avoiding the cost of a second integrated circuit of SIM type and of the necessary certification.

In the event of authentication with the telephone network, the temporary subscriber profile and the authentication response are stored temporarily, and they are deleted when the companion device is once more in communication with the subscriber device 10 via the short-range interface 21, 22. The delete order is a function of the event of detecting communication or a function of an order issued by the server 41.

The invention claimed is:

1. A method of authenticating a companion device with a server of a mobile telephone operator, the companion device being connectable to a communication service of the mobile telephone operator via a subscriber device that has performed a first authentication with the server, the companion device being in communication with the subscriber device via a first wireless communication interface of short range; the method comprising:
   the subscriber device delivering to the companion device a temporary profile and an authentication response signed by the subscriber device for sending to the server;
   installing the temporary profile to configure a second wireless communication interface of the companion device; and
   requesting a second authentication from the server via the second wireless communication interface by using the delivered authentication response so as to authorize the second wireless communication interface when the companion device and the subscriber device are not in communication with each other via the first wireless communication interface.

2. The method according to claim 1, wherein the authentication response was signed by the subscriber device in order to perform the first authentication.

3. The method according to claim 1, further comprising:
   notifying, by the subscriber device, the server in order to allow the authentication response to be used during the second authentication.

4. The method according to claim 3, wherein the notifying includes sending a notification comprising the authentication response.

5. The method according to claim 1, wherein the authentication response is encrypted by the subscriber device prior to delivery.

6. The method according to claim 1, wherein the authentication response is delivered via the first wireless communication interface or via a secure third interface of short range.

7. The method according to claim 1, further comprising:
   notifying, by the companion device, the server or a services server with presence information concerning the presence of a user so as to trigger forwarding of services coming from the services server directly to the companion device via the second wireless communication interface.

8. The method according to claim 1, wherein the second wireless communication interface is a mobile telephone communication module and the authentication response includes at least a response cryptogram that was generated from a random number transmitted by the server and encrypted using a private key hosted by the subscriber device.

9. The method according to claim 1, wherein the second wireless communication interface complies with the IEEE802.11 standard, and the authentication response enables the companion device to perform authentication of the extensible authentication protocol (EAP) type.

10. A system comprising a companion device and a subscriber device for authenticating the companion device with an authentication server of a mobile telephone operator, the companion device being connectable to a communication service of the mobile telephone operator via a subscriber device that has performed a first authentication with the authentication server, the companion device being in communication with the subscriber device via a first wireless communication interface of short range; the system comprising:
   means included with the subscriber device for delivering to the companion device a temporary profile and an authentication response signed by the subscriber device for sending to the authentication server;
   means included with the companion device for installing the temporary profile in order to configure a second wireless communication interface of the companion device; and
   means included with the companion device for executing a second authentication with the authentication server via the second wireless communication interface by using the delivered authentication response so as to authorize the second wireless communication interface when the companion device and the subscriber device are not in communication with each other via the first wireless communication interface.

11. A system, comprising:
   an authentication server of a mobile telephone network having a communication service;
   a subscriber device, comprising:
      a processor; and
      a short-range wireless communication interface;
      wherein the subscriber device has performed a first authentication with the authentication server; and
   a companion device, comprising:
      a processor;
      a short-range wireless communication interface that communicates with the subscriber device; and
      a mobile telephone communication interface that communicates with the mobile telephone network,
   wherein:
      the subscriber device delivers, to the companion device via the short-range wireless communication interface, a temporary profile and an authentication response signed by the subscriber device;
      the companion device installs the delivered temporary profile to configure the mobile telephone communication interface; and
      when the companion device and the subscriber device are not in communication with each other via the short-range wireless communication interface, the companion device executes a second authentication with the authentication server via the configured mobile telephone communication interface by using the authentication response to authorize the mobile telephone communication interface.

\* \* \* \* \*